United States Patent
Jezewski et al.

(10) Patent No.: US 9,258,114 B2
(45) Date of Patent: Feb. 9, 2016

(54) QUANTUM KEY DISTRIBUTION (QSD) SCHEME USING PHOTONIC INTEGRATED CIRCUIT (PIC)

(71) Applicant: Intel Corporation, Santa Clara, CA (US)

(72) Inventors: Christopher J Jezewski, Hillsboro, OR (US); Kelin J Kuhn, Aloha, OR (US); Marko Radosavljevic, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 442 days.

(21) Appl. No.: 13/705,720

(22) Filed: Dec. 5, 2012

(65) Prior Publication Data

US 2014/0153720 A1    Jun. 5, 2014

(51) Int. Cl.
*H04L 9/08*    (2006.01)
(52) U.S. Cl.
CPC .................................. *H04L 9/0852* (2013.01)

(58) Field of Classification Search
CPC ...................................................... H04L 9/0883
See application file for complete search history.

(56) References Cited

U.S. PATENT DOCUMENTS

| | | | |
|---|---|---|---|
| 7,649,996 B2* | 1/2010 | Nishioka et al. | 380/255 |
| 8,054,976 B2* | 11/2011 | Harrison et al. | 380/278 |
| 8,270,841 B2* | 9/2012 | Nishioka et al. | 398/140 |

OTHER PUBLICATIONS

Intel, A hybrid silicon laser, Sep. 18, 2006.*
Hyundai Park, Hybrid silicon evanescent laser fabricated with a silicon wavaguide and III-V offset quantum wells, Oct. 18, 2005.*

* cited by examiner

*Primary Examiner* — Teshome Hailu
*Assistant Examiner* — Thanh Le
(74) *Attorney, Agent, or Firm* — Forefront IP Lawgroup, PLLC (57) ABSTRACT

Described herein are techniques related to implementation of a quantum key distribution (QKD) scheme by a photonic integrated circuit (PIC). For example, the PIC is a component in a wireless device that is used for quantum communications in a quantum communications system.

27 Claims, 5 Drawing Sheets

QUANTUM KEY DISTRIBUTION (QSD) SCHEME USING PHOTONIC INTEGRATED CIRCUIT (PIC)

BACKGROUND

A quantum key distribution (QKD) system uses quantum mechanics to guarantee secure communications in a quantum communications system. For example, the QKD system transmits cryptographic key data encoded in quantum states of individual optical photons. In this example, an advantage of the QKD system is that, it allows secure transmission of a key data over unsecured optical links with security guaranteed by fundamental quantum properties of light rather than by computational complexity of certain mathematical functions. For example, the quantum property may utilize single photons that cannot be split into smaller pieces. In this example, a possible interception by a third party may allow diversion of the photons or simply the photons may not arrive at intended destinations.

The QKD system is used to produce and distribute a key and not to transmit any message data. This key may then be used with any chosen encryption algorithm to encrypt and decrypt a message, which may be transmitted over a standard communications channel.

The following Detailed Description is provided with reference to the accompanying figures. In the figures, the left-most digit(s) of a reference number usually identifies the figure in which the reference number first appears. The use of the same reference numbers in different figures indicates similar or identical items.

DETAILED DESCRIPTION

This document discloses one or more systems, apparatuses, methods, etc. for implementing a quantum key distribution (QKD) scheme in a chip level such as, in a photonic integrated circuit (PIC). For example, the PIC is a component of a wireless device that is used for quantum communications in a quantum communications system. In this example, the component at the chip level may include a laser, a polarizer, a modulator, a photo detector, and the like that is used in quantum communications.

For example, the laser that is configured to provide light signals may utilize an Intel® Silicon (Si) laser or other III-V based lasers to create hundreds of lasers in a single bonding step. This single bonding step is compact that it allows multiple lasers to be integrated in a single chip or PIC. In another example, a manipulation of the light signals from the laser may utilize corrugated gratings to allow the QKD scheme to be implemented in the PIC. Accordingly, PIC may implement the QKD scheme using semiconductor based laser and optics as shown in the examples above.

Figure 1:
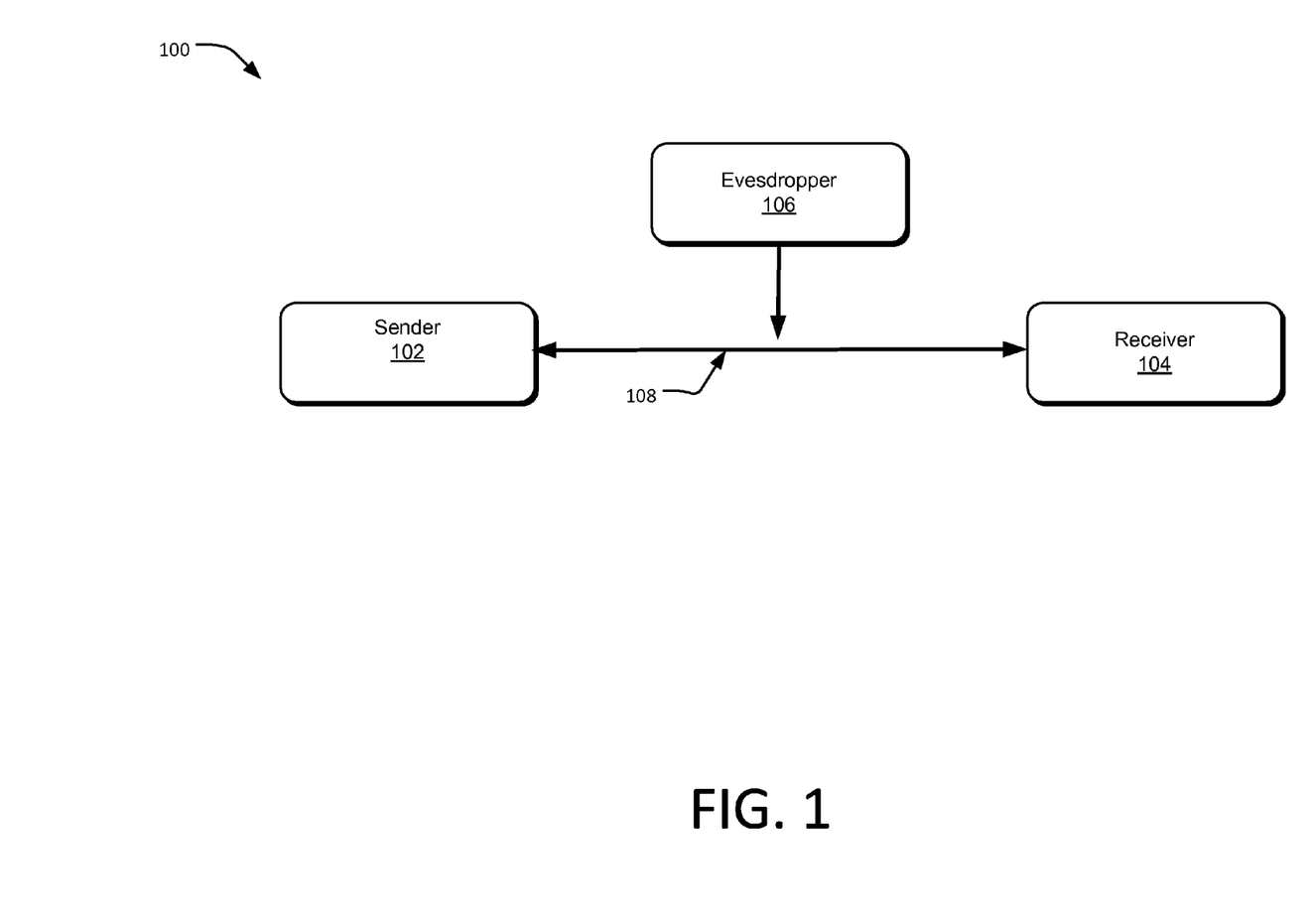
FIG. 1 depicts a scenario that utilizes a quantum key distribution (QKD) scheme to guarantee secure communications in a quantum communications system.

FIG. 1 depicts a scenario 100 that utilizes a QKD scheme to guarantee secure communications in a quantum communications system. Scenario 100 shows a sender 102, a receiver 104, and an eavesdropper 106. Furthermore, scenario 100 depicts a channel 108 that is used for quantum communications between the sender 102 and the receiver 104.

As shown, the sender 102 communicates encrypted messages to the receiver 104 through the channel 108. For example, using the BB84 protocol, the sender 102 transmits qubits (not shown) to the receiver 104 by modulating at least one photon (not shown) that is produced by a semiconductor based laser (not shown) in the quantum communications system. In this example, the receiver 104 receives and measures the qubits that were transmitted by the sender 102. The measurements of the received qubits may not actually be correct measurements of the transmitted qubits; however, these measurements at the receiver 104 may provide initial guess or determination for the measurements of the transmitted qubits. Thereafter, the receiver 104 may negotiate a key (not shown) with the sender 102 in order to determine which of the qubits were properly measured by the receiver 104 and which qubits were not properly measured. If the measurements at the receiver 104 are all correct based on the negotiated key, then there is no third party (e.g., eavesdropper 106) who may have attempted to listen to this communication of encrypted messages.

During this quantum communications between the sender 102 and the receiver 104, the eavesdropper 106 may tap into the channel 108 and measures the transmitted qubits that were sent by the sender 102 to the receiver 104. Due to quantum mechanics, the measurements made by the eavesdropper 106 may create a change in characteristics of the at least photon used in the quantum communications system. For example, the measurements made by the eavesdropper 106 may provide a different set of qubits to the receiver 104 as compared to an initial set of qubits that were transmitted at the sender 102. This difference in qubits may contain a different polarization of the at least one photon when received at the receiver 104. In this example, the change in the characteristics of the photon creates an additional error in the measurements of the transmitted qubits at the side of the receiver 104. The additional error may provide a basis for the sender 102 and the receiver 104 to detect the act of measurements made by the eavesdropper 106. For example, a threshold is configured at the side of the sender 102 and receiver 104 to determine whether there are measurements by a third party (e.g., eavesdropper 106) that provided the additional errors.

In an implementation, the scenario 100 may be implemented and fabricated on photonic integrated circuit (PIC) or photonic chip level of a wireless device (now shown) that the sender 102 and the receiver 104 may use during quantum communications. For example, the wireless device may include, but not limited to, a mobile phone, a cellular phone, a smartphone, a personal digital assistant, a tablet computer, a netbook, a notebook computer, a laptop computer, a multimedia playback device, a digital music player, a digital video player, a navigational device, a digital camera, and the like. Furthermore, the scenario 100 may be implemented on ATM machine transactions where a third person (e.g., eavesdropper 106) may possibly attempt to tap on the quantum communications system to listen on the ATM machine transactions.

The above discussion on unique property of the QKD scheme to detect the presence of the eavesdropper 106 is but one implementation and other variations may be available without affecting current implementations in this disclosure.

Figure 2:
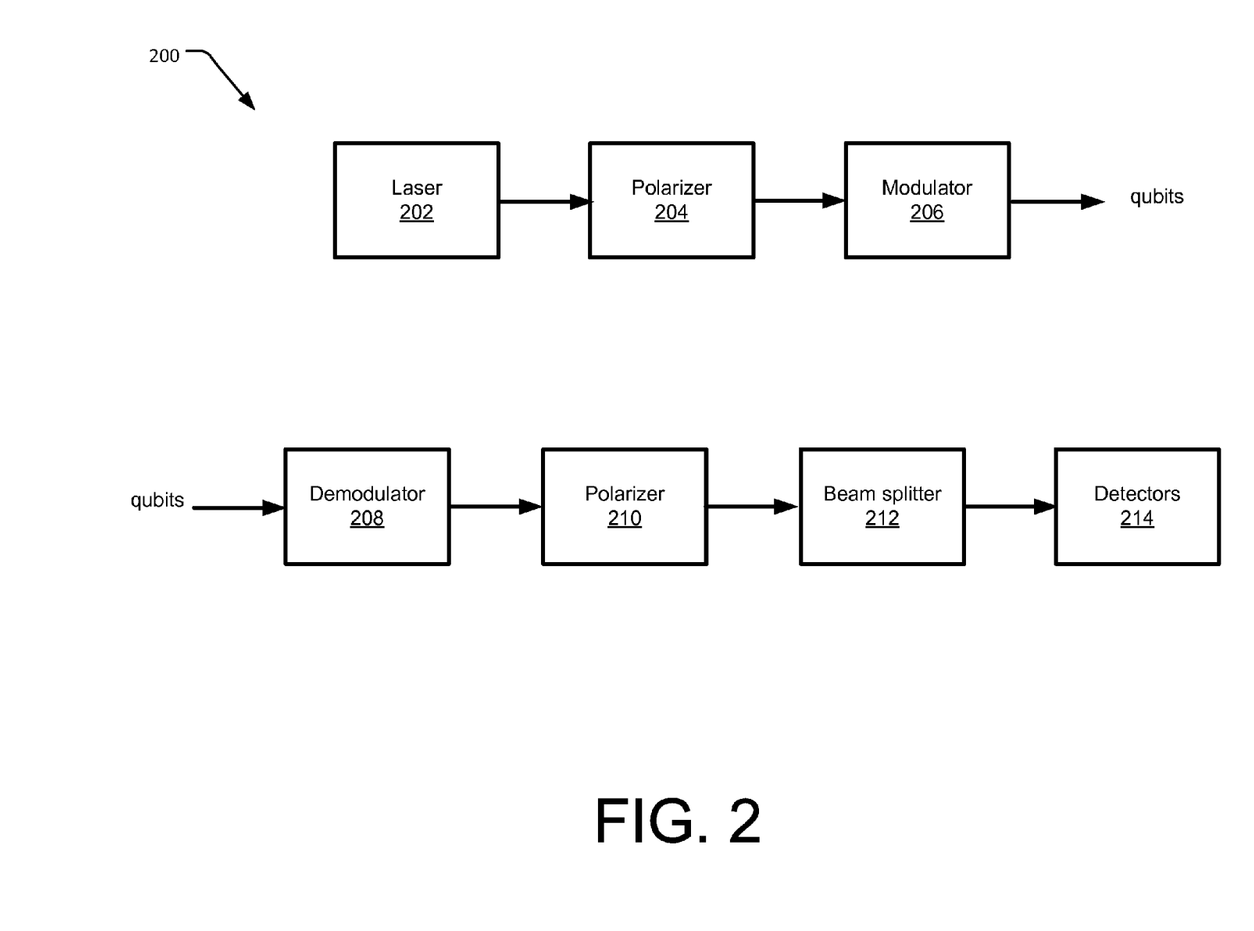
FIG. 2 is an illustrative diagram of an example quantum communications system that that utilizes a quantum key distribution (QKD) scheme.

FIG. 2 shows a quantum communications system 200 that utilizes the QKD scheme. In an implementation, the quantum communications system 200 may be fabricated on the photonic chip level that is installed in the wireless device.

As shown, the quantum communications system 200 includes a laser light source 202, a polarizer 204, and a modulator 206 to transmit a modulated quantum communication photonic signal. Furthermore a demodulator 208, a polarizer 210, beam splitter 212, and detectors 214 may be used to receive and measure the modulated quantum communication photonic signal that may represent the qubits as discussed above. Additional blocks or components may be included to the quantum communications system 200 without affecting the current implementations herein.

In an implementation, the laser light source 202 may provide a stream of particles called "photons" that may be used to carry out information such as the "qubits" for the BB84 protocol. For example, the laser light source 202 may use an Intel® Si laser or other III/V based lasers that may be integrated in a single chip. In this example, the laser light source 202 may run in a highly attenuated mode and optically pumped so that only one photon may be generated at any time serving as the single photon information carrier source. A method of processes to perform fabrication of the laser light source 202 in the photonic chip may be found for example in U.S. Pat. No. 7,734,123 entitled, "Evanescent III-V silicon photonics device with spin coat bonding"; U.S. Pat. No. 8,111,729 entitled, "Multi-wavelength Hybrid Silicon Laser Array"; and in US Patent Application No. 20090245316 entitled, "Multi-wavelength Hybrid Silicon Laser Array."

In an implementation, the polarizer 204 may receive a light source output of the laser light source 202 and the polarizer 204 may be set to a preselected modification key value relative to a receiver system at the receiver 104. For example, the preselected modification key value may be represented by polarization of the photons that passes through the polarizer 204. In this example, the polarizer 204 may convert the light source output from undefined or mixed polarization into a beam with well-defined polarization. The well-defined polarization may be processed at the receiver system using the same modification key value as used in the transmitting side.

In an implementation, an output of the polarizer 204 is received by the modulator 206 to create an arbitrarily modulated quantum communication photonic signal (e.g., qubits) that may be transmitted through the quantum channel 108. The modulator 206 may be provided with a modulation that is randomly selected from a set of modulations. For example, the modulator 206 may be configured to utilize a phase modulation or a polarization modulation.

With continuing reference to FIG. 2, the qubits are received by a demodulator 208 that is configured to be of the same type as that in place in the modulator 206. For example, if the modulator 206 implements phase modulation to transmit the qubits, then the demodulator 208 is configured to be a phase demodulator in order to receive the transmitted qubits. In another example, the demodulator 208 may also be a polarization demodulator if the modulator 206 implements polarization modulation of the qubits.

In an implementation, the polarizer 210 is set to the same setting as the polarizer 204. For example, after the negotiation of the key by the receiver 104 with the sender 102, the key is implemented during decoding at the polarizer 204 to obtain measurements of the transmitted qubits. After polarization at the polarizer 210, a resulting signal then contacts a polarization beam splitter 212.

In an implementation, the beam splitter 212 in its most common form is a cube that is made from two triangular glass prisms to split the signal from the polarizer 210 into beams of differing polarization. In this implementation, the differing polarizations are measured by the detectors 214. A method of processes to perform fabrication of the detectors 214 in the photonic chip may be found for example in U.S. Pat. No. 7,948,010 entitled, "Dual Seed Semiconductor Photodetectors"; U.S. Pat. No. 7,553,687 entitled, "Dual Seed Semiconductor Photodetectors"; U.S. Pat. No. 7,700,975 entitled, "Schottky Barrier Metal-germanium Contact in Metal-germanium-metal Photodetectors"; US Patent App. No. 20090243023 entitled, "Dual Seed Semiconductor Photodetectors"; US Patent App. No. 20080001181, entitled, "Complementarily doped metal-semiconductor interfaces to reduce dark current in MSM photodetectors"; US Patent App. No. 20070235877 entitled, "Integration scheme for semiconductor photodetectors on an integrated circuit chip"; and US Patent App. No 20070235824 entitled, "Novel Schottky barrier metal-germanium contact in metal-germanium-metal photodetectors."

In an implementation, a manipulation of the light signals from the laser light source 202 to the modulator 206, or from the demodulator 208 to the detectors 214 may utilize corrugated gratings in the photonic chip that implements the QKD scheme. A method or processes to perform fabrication of the corrugated gratings may be found for example in U.S. Pat. No. 8,223,811 entitled, "Narrow Surface Corrugated Grating" and in US Patent Application No. 20110243496 entitled, "Narrow Surface Corrugated Grating." Furthermore, a method or processes to fabricate electrical conductors for the photonic chip may be found for example in US Patent Application No. 20090244873 entitled, "optical package" and in U.S. Pat. No. 7,418,163 entitled, "Optoelectrical Package."

Figure 3:
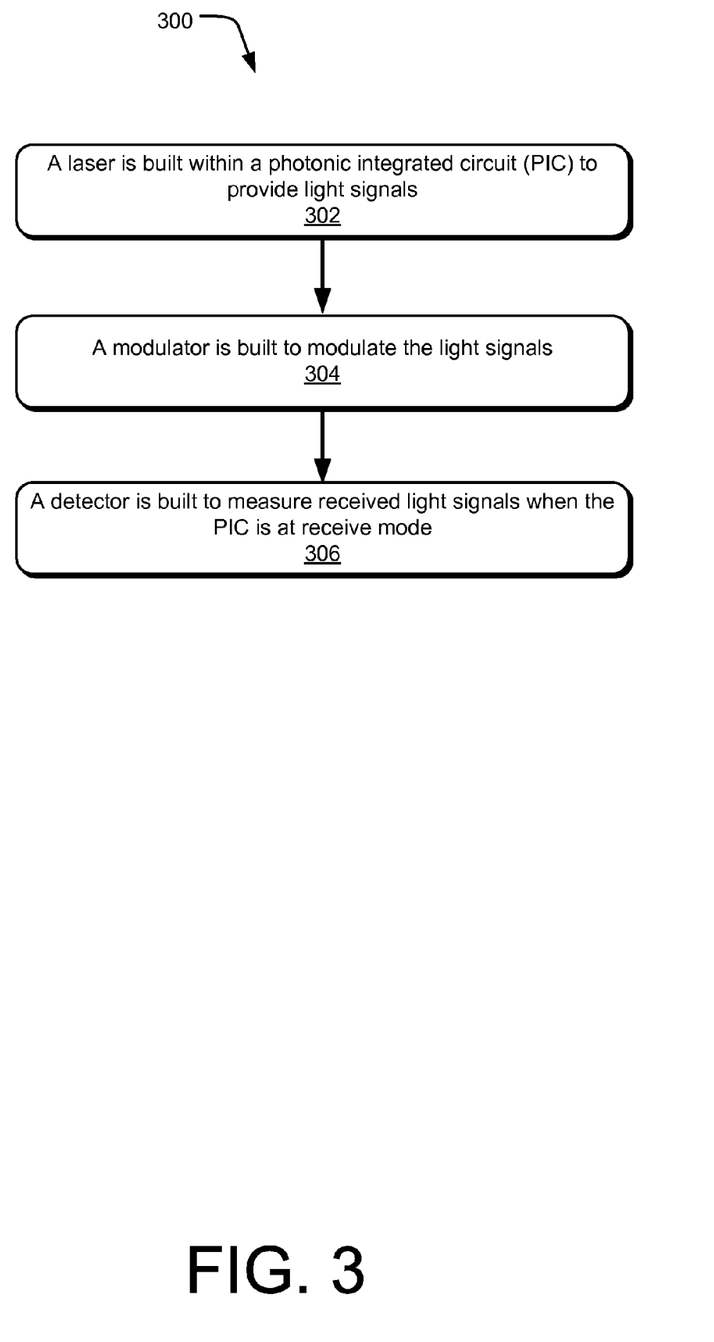
FIG. 3 is an illustrative diagram of an example method for fabricating a photonic integrated circuit (PIC) that implements a quantum key distribution (QKD) scheme.

FIG. 3 illustrates a method 300 for fabricating a PIC that implements QKD scheme for secure quantum communications. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 302, a laser is built on the PIC to provide a light source. For example, hybrid silicon lasers (e.g., laser 202) are used as QKD lasers to implement the QKD scheme in the PIC. In this example, the hybrid silicon lasers emit light signals with different wavelengths as described in U.S. Pat. No. 8,111,729 entitled, "Multi-wavelength Hybrid Silicon Laser Array"; and in US Patent Application No. 20090245316 entitled, "Multi-wavelength Hybrid Silicon Laser Array." Furthermore, fabrication of integrated waveguides for the emitted light signals is described in US Patent App. No. 20100166360 entitled, "Acid block for Hybrid Silicon Device Processing Compatible with Low-loss Waveguides."

At block 304, a modulator is built on the PIC to modulate the light signals. For example, the QKD lasers are coupled with the modulators (e.g., modulator 206) to transmit qubits signals. In this example, the modulator 206 may include any type of existing integrated optical modulators and it may apply phase modulations, polarized modulations, and the like.

At block 306, a detector is built to measure received light signals when the PIC is at receiving mode. During quantum communications that implement the QKD scheme, the PIC may act as a transceiver and utilizes a detector (e.g., detector 214) to receive and measure light signals from a transmitting side (e.g., sender 102). The detector 214 may include the photo detectors described in the US patents and applications cited in FIG. 2 above.

Figure 4:
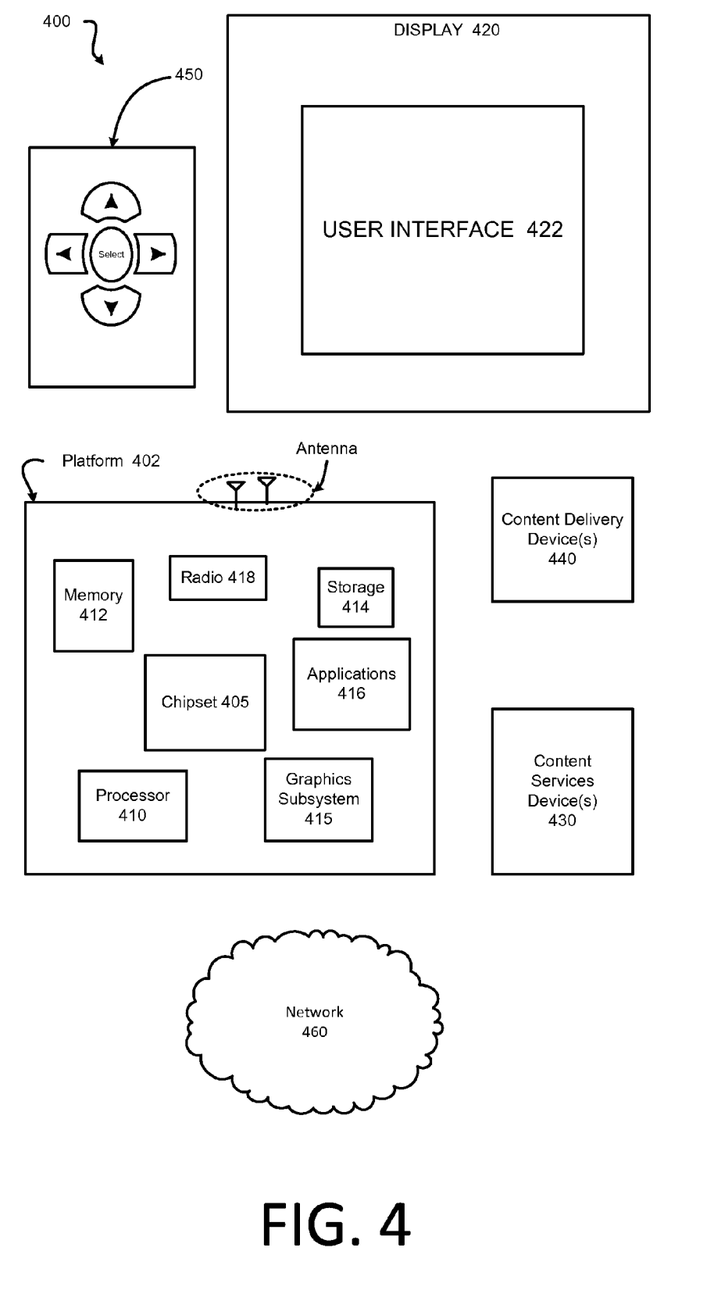
FIG. 4 is an illustrative diagram of an example system that utilizes a photonic integrated circuit (PIC) to implement secure communications in a quantum communications system.

FIG. 4 illustrates another example system 400 in accordance with the present disclosure. In various implementations, system 400 may be a media system although system 400 is not limited to this context. For example, system 400 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile interne device (MID), messaging device, data communication device, and so forth.

In various implementations, system 400 includes a platform 402 coupled to a display 420. Platform 402 may receive content from a content device such as content services device(s) 430 or content delivery device(s) 440 or other similar content sources. A navigation controller 450 including one or more navigation features may be used to interact with, for example, platform 402 and/or display 420. Each of these components is described in greater detail below.

In various implementations, platform 402 may include any combination of a chipset 405, processor 410, memory 412, storage 414, graphics subsystem 415, applications 416 and/or radio 418. Chipset 405 may provide intercommunication among processor 410, memory 412, storage 414, graphics subsystem 415, applications 416 and/or radio 418. For example, chipset 405 may include a storage adapter (not depicted) capable of providing intercommunication with storage 414.

Processor 410 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 410 may be dual-core processor(s), dual-core mobile processor(s), and so forth that is coupled to the PIC as discussed in FIG. 2 above.

Memory 412 may be implemented as a volatile memory device such as, but not limited to, a Random Access Memory (RAM), Dynamic Random Access Memory (DRAM), or Static RAM (SRAM).

Storage 414 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 414 may include technology to increase the storage performance enhanced protection for valuable digital media when multiple hard drives are included, for example.

Graphics subsystem 415 may perform processing of images such as still or video for display. Graphics subsystem 415 may be a graphics processing unit (GPU) or a visual processing unit (VPU), for example. An analog or digital interface may be used to communicatively couple graphics subsystem 415 and display 420. For example, the interface may be any of a High-Definition Multimedia Interface, DisplayPort, wireless HDMI, and/or wireless HD compliant techniques. Graphics subsystem 415 may be integrated into processor 410 or chipset 405. In some implementations, graphics subsystem 415 may be a stand-alone card communicatively coupled to chipset 405.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 418 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 418 may operate in accordance with one or more applicable standards in any version.

In various implementations, display 420 may include any television type monitor or display. Display 420 may include, for example, a computer display screen, touch screen display, video monitor, television-like device, and/or a television. Display 420 may be digital and/or analog. In various implementations, display 420 may be a holographic display. Also, display 420 may be a transparent surface that may receive a visual projection. Such projections may convey various forms of information, images, and/or objects. For example, such projections may be a visual overlay for a mobile augmented reality (MAR) application. Under the control of one or more software applications 416, platform 402 may display user interface 422 on display 420.

In various implementations, content services device(s) 430 may be hosted by any national, international and/or independent service and thus accessible to platform 402 via the Internet, for example. Content services device(s) 430 may be coupled to platform 402 and/or to display 420. Platform 402 and/or content services device(s) 430 may be coupled to a network 460 to communicate (e.g., send and/or receive) media information to and from network 460. Content delivery device(s) 440 also may be coupled to platform 402 and/or to display 420.

In various implementations, content services device(s) 430 may include a cable television box, personal computer, network, telephone, Internet enabled devices or appliance capable of delivering digital information and/or content, and any other similar device capable of unidirectionally or bidirectionally communicating content between content providers and platform 402 and/display 420, via network 460 or directly. It will be appreciated that the content may be communicated unidirectionally and/or bidirectionally to and from any one of the components in system 400 and a content provider via network 460. Examples of content may include any media information including, for example, video, music, medical and gaming information, and so forth.

Content services device(s) 430 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 402 may receive control signals from navigation controller 450 having one or more navigation features. The navigation features of controller 450 may be used to interact with user interface 422, for example. In embodiments, navigation controller 450 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 450 may be replicated on a display (e.g., display 420) by movements of a pointer, cursor, focus ring, or other visual indicators displayed on the display. For example, under the control of software applications 416, the navigation features located on navigation controller 450 may be mapped to virtual navigation features displayed on user interface 422, for example. In embodiments, controller 450 may not be a separate component but may be integrated into platform 402 and/or display 420. The present disclosure, however, is not limited to the elements or in the context shown or described herein.

In various implementations, drivers (not shown) may include technology to enable users to instantly turn on and off platform 402 like a television with the touch of a button after initial boot-up, when enabled, for example. Program logic may allow platform 402 to stream content to media adaptors or other content services device(s) 430 or content delivery device(s) 440 even when the platform is turned "off" In addition, chipset 405 may include hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 400 may be integrated. For example, platform 402 and content services device(s) 430 may be integrated, or platform 402 and content delivery device(s) 440 may be integrated, or platform 402, content services device(s) 430, and content delivery device(s) 440 may be integrated, for example. In various embodiments, platform 402 and display 420 may be an integrated unit. Display 420 and content service device(s) 430 may be integrated, or display 420 and content delivery device(s) 440 may be integrated, for example. These examples are not meant to limit the present disclosure.

In various embodiments, system 400 may be implemented as a wireless system, a wired system, or a combination of both. When implemented as a wireless system, system 400 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 400 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 402 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 4.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Figure 5:
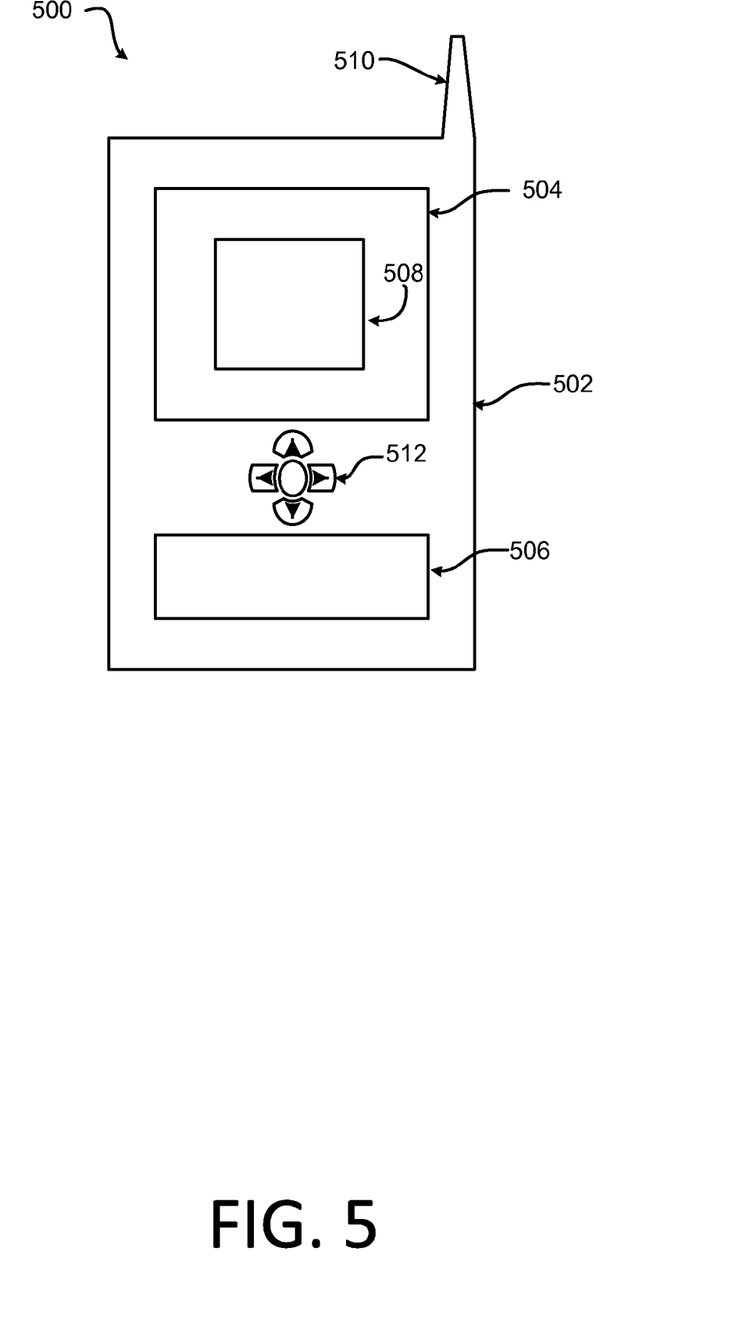
FIG. 5 is an illustrative diagram of an example wireless device, all arranged in accordance with at least some implementations of present disclosure.

As shown in FIG. 5, device 500 may include a housing 502, a display 504, an input/output (I/O) device 506, and an antenna 508. Device 500 also may include navigation features 512. Display 504 may include any suitable display unit for displaying information appropriate for a mobile computing device. I/O device 506 may include any suitable I/O device for entering information into a mobile computing device. Examples for I/O device 506 may include an alphanumeric keyboard, a numeric keypad, a touch pad, input keys, buttons, switches, rocker switches, microphones, speakers, voice recognition device and software, and so forth. Information also may be entered into device 500 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A photonic integrated circuit (PIC) that utilizes a quantum key distribution (QSD) scheme comprising:
    a hybrid silicon laser that is configured to produce light signals, wherein the hybrid silicon is fabricated from semiconductor on a chip level;
    a polarizer that receives the light signals, the polarizer is configured to change polarization of the light signals into a beam that includes a well-defined polarization, wherein the polarizer is fabricated from semiconductor on a chip level;
    a modulator coupled to the laser array, the modulator modulates the beam for transmission through a quantum channel, wherein the modulator is fabricated from semiconductor on a chip level.

2. A PIC as recited in claim 1, wherein the hybrid silicon laser utilizes a III-V based laser.

3. A PIC as recited in claim 1, wherein the light signals include at least one photon that is configured to be a carrier of information.

4. A PIC as recited in claim 1, wherein the hybrid silicon laser utilizes a corrugated grating that is configured to transfer the light signals with different wavelengths from the hybrid silicon laser to the modulator.

5. A PIC as recited in claim 1, wherein the polarizer is set to the same setting as another polarizer of a receiver system in a quantum communications system.

6. A PIC as recited in claim 1, wherein the polarizer utilizes a beam splitter that is configured to split the light signal into different polarization.

7. A PIC as recited in claim 1, wherein the modulator is configured to utilize a phase modulation or polarization modulation of the beam to transmit qubits in the quantum channel.

8. A PIC as recited in claim 1, wherein the modulator is set to the same setting with a demodulator of a receiver system in a quantum communications system.

9. A PIC as recited in claim 1 further comprising a photo detector that is configured to measure received light signals when the PIC is at receive mode, wherein the photo detector utilizes a corrugated grating in receiving the light signals.

10. A wireless device that utilizes a quantum key distribution (QSD) scheme comprising:
    a photonic integrated circuit (PIC) that includes:
        a laser array that is configured to produce light signals, wherein the laser array is fabricated from semiconductor at a chip level;
        a polarizer that receives the light signals, wherein the laser array is fabricated from semiconductor at a chip level;
        a modulator coupled to the laser array, the modulator modulates the polarized light signals for transmission in a quantum channel, wherein the laser array is fabricated from semiconductor at a chip level;
    a processor configured to the PIC.

11. A wireless device as recited in claim 10, wherein the laser array is a hybrid silicon layer that utilizes a Si laser or III-V based lasers.

12. A wireless device as recited in claim 10, wherein the hybrid silicon laser utilizes a corrugated grating that is configured to transfer the light signals with different wavelengths from the hybrid silicon laser to the modulator.

13. A wireless device as recited in claim 10, wherein the polarizer is set to the same setting as another polarizer of a receiver system in a quantum communications system.

14. A wireless device as recited in claim 10, wherein the polarizer is configured to change polarization of the light signals into a beam that includes a well-defined polarization.

15. A wireless device as recited in claim 10, wherein the polarizer utilizes a beam splitter to split the light signal into differing polarization.

16. A wireless device as recited in claim 10, wherein the modulator is configured to utilize a phase modulation or polarization modulation of the polarized light signals to transmit qubits in the quantum channel.

17. A wireless device as recited in claim 10, wherein the modulator is set to the same setting with a demodulator of a receiver system in a quantum communications system.

18. A wireless device as recited in claim 10, further comprising a photo detector that is configured to measure received light signals when the PIC is at receive mode, wherein the photo detector utilizes a corrugated grating in receiving the light signals.

19. A method for fabricating a photonic integrated circuit (PIC) that utilizes a quantum key distribution (QSD) scheme comprising:
   building a hybrid silicon laser array in semiconductor and at a chip level, the hybrid silicon laser array being configured to produce light signals;
   building a polarizer in semiconductor and at a chip level, the polarizer being configured to receive and change polarization of the light signals;
   building a modulator in semiconductor and at a chip level, the modulator built to be coupled to the hybrid silicon laser array, the modulator being configured to modulate the polarized light signals for transmission in a quantum channel.

20. A method as recited in claim 19, wherein the laser array is a hybrid silicon layer that utilizes a Si laser or III-V based lasers.

21. A method as recited in claim 19, wherein the hybrid silicon laser utilizes a corrugated grating that is configured to transfer the light signals with different wavelengths from the hybrid silicon laser to the modulator.

22. A method as recited in claim 19, wherein the polarizer is set to the same setting as another polarizer of a receiver system in a quantum communications system.

23. A method as recited in claim 19, wherein the polarizer is configured to change polarization of the light signals into a beam that includes a well-defined polarization.

24. A method as recited in claim 19, wherein the polarizer utilizes a beam splitter to split the light signal into differing polarization.

25. A method as recited in claim 19, wherein the modulator uses a phase modulation or polarization modulation of the polarized light signals to transmit qubits in the quantum channel.

26. A method as recited in claim 19, wherein the modulator is set to the same setting with a demodulator of a receiver system in a quantum communications system.

27. A method as recited in claim 19 further comprising building a photo detector that is configured to measure received light signals when the PIC is at receive mode, wherein the photo detector utilizes a corrugated grating in receiving the light signals.

* * * * *